No. 672,327. Patented Apr. 16, 1901.
F. A. LUNDQUIST.
SWITCH FOR TELEPHONE EXCHANGES.
(Application filed Jan. 22, 1900.)
(No Model.)
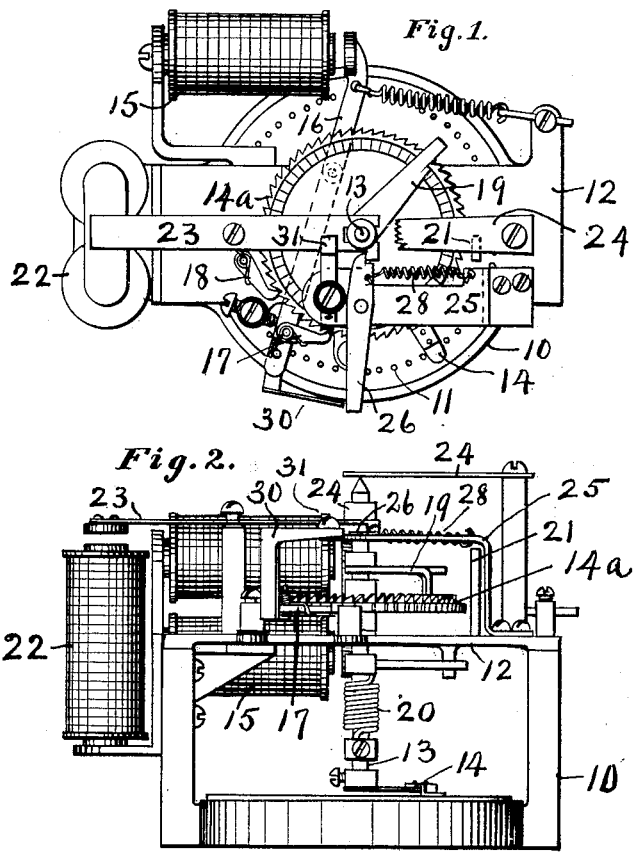
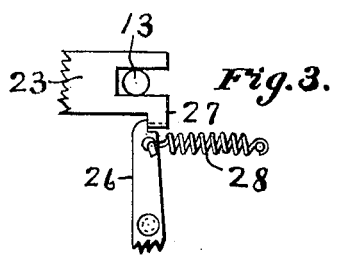
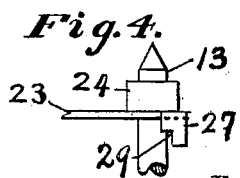
Witnesses:
Howard A. Redfield.
Carlos Escobar.
Inventor:
Frank A. Lundquist
By Casper L. Redfield,
Attorney.

UNITED STATES PATENT OFFICE.

FRANK A. LUNDQUIST, OF CHICAGO, ILLINOIS, ASSIGNOR TO M. E. RICHARDSON, TRUSTEE, OF STERLING, KANSAS.

SWITCH FOR TELEPHONE-EXCHANGES.

SPECIFICATION forming part of Letters Patent No. 672,327, dated April 16, 1901.

Application filed January 22, 1900. Serial No. 2,256. (No model.)

*To all whom it may concern:*

Be it known that I, FRANK A. LUNDQUIST, a citizen of the United States of America, and a resident of Chicago, county of Cook, State of Illinois, have invented certain new and useful Improvements in Switches for Telephone-Exchanges, of which the following is a specification.

My invention relates to automatic telephone-exchanges, and has for its object an improvement in the switching mechanism which will make the automatic operations more certain.

In the form of switch illustrated in the accompanying drawings, which form is suitable for automatic telephone-exchanges, there is a pointer or contact-making device and a magnet for moving it step by step into electrical connection with successive contact-points, a second magnet for releasing the pointer from its propelling mechanism, and a spring for returning the pointer to its normal position when so released. There is also means for reëngaging the pointer to its propelling mechanism, so that when the propelling-magnet again operates it may again move the pointer. As the pointer is sometimes moved a considerable distance and as it takes an appreciable period of time for a pointer so moved to return to its normal position, it follows that the electrical connection which sends a current through the releasing-magnet must be held long enough to permit the pointer to reach its normal position from the most distant contact-point. If the electrical connection is not held long enough, the pointer may become reëngaged to the propelling mechanism and stopped at some point other than its normal position.

It is the object of my invention to provide means for preventing the premature reëngagement of the pointer with its propelling mechanism, so that the pointer may be definitely returned to its normal position irrespective of the length of time which the current flows through the releasing-magnet.

In the accompanying drawings, Figure 1 is a plan of a switch suitable for automatic telephone-exchanges. Fig. 2 is an elevation of the same, and Figs. 3 and 4 are enlarged details.

In the said drawings, 10 is a frame on which are supported a series of insulated contact-points 11. Pivoted in a plate 12, supported on frame 10, is a spindle 13, which carries a pointer 14, adapted to be moved over the contact-points 11. Loosely mounted on the spindle 13 is a ratchet-wheel 14$^a$, which is provided with both spur and crown teeth. A magnet 15, whose armature-lever 16 is provided with a pawl 17, serves as a means for rotating said wheel by engagement with its spur-teeth. A holding-pawl 18 serves to prevent a return movement of said ratchet-wheel. Secured to the spindle 13 is an arm 19, one portion of which is bent downward and serves as a dog for engaging the crown-teeth of the wheel 14$^a$. A spring 20, one end of which is secured to the spindle 13 and the other end to any suitable support, serves as a means for turning the spindle 13 in a direction opposite to that of the wheel 14$^a$. A post 21 in the path of the arm 19 serves to stop said arm and the connected spindle and pointer at their normal rotative position. A releasing-magnet 22 and its armature-lever 23, which lever engages the under face of a collar 24 on the spindle 13, serve to lift said spindle, so as to raise the dog on arm 19 clear of the crown-teeth on wheel 14. A flat spring 24, bearing on the top of the spindle 13, serves to return said dog to engagement with the crown-teeth of said wheel 14 when the spindle 13 is no longer supported. On a bracket 25 is pivoted a lever 26, one end of which engages a lip 27 on the inner end of the armature-lever 23. When the inner end of the armature-lever 23 is elevated through the action of magnet 22, the spring 28 draws the inner end of lever 26 under the lip 27, so as to maintain the inner end of the armature-lever 23, and consequently the spindle 13 and arm 19, in an elevated position after the magnet 22 ceases to act. The lip 27 is notched, as shown in elevation at 29 in Fig. 4. It is in the notch 29 that the end of the lever 26 rests, and the effect of the notch is to prevent the lever 26 from passing farther under the lip 27 than just enough for it to act as a catch to support the spindle 13 in its elevated position. On the end of the armature-lever 16 is an arm 30, which projects to a point adjacent to the outer end of the lever 26. The arm 30 and lever 26 are so related to each other that when the magnet 15 is energized the arm 30 will strike the lever 26 and release it from the lip 27, permitting the spindle 13 to descend and the dog on arm 19 to reëngage the crown-teeth of wheel 14.

When the spindle 13 is supported in its elevated position, it will be apparent that the pointer 14 is raised above and clear from the contact-points 11. It therefore becomes necessary to provide a normal contact-point which will come into action when the pointer 14 is in its elevated and normal position. While such a normal contact-point might be made by elevating one of the contact-points 11 or by making one in the nature of a stop to engage the side of the pointer 14, I prefer to make the normal contact-point in the nature of a contact device which will come into action through the elevation of the spindle 13. To this end I secure on the bracket 25 an insulated piece 31, which will come into contact with the armature-lever 23 when the inner end of said armature-lever is raised through the action of magnet 22.

From the foregoing description it will be seen that the normal position of pointer 14 is an elevated one out of connection with the contact-points 11 and that the first action of magnet 15 is to release the pointer from its elevated position, so that it will drop to connection with the contact-points 11, and also to move the pointer forward one step. Each subsequent action of magnet 15 serves to move the pointer 14 step by step over the successive contact-points. It will also be seen that the action of magnet 22 is to release the pointer 14 from its propelling mechanism and to cause it to be caught and held in a position of such release, so that the said pointer may be free to be returned to its normal rotative position by spring 20 irrespective of the length of time during which magnet 22 acts.

What I claim is—

1. In a switching mechanism, a pointer and a magnet for moving it, a second magnet for lifting said pointer out of engagement with its propelling mechanism, and a catch for holding said pointer in its elevated position.

2. In a switching mechanism, a pointer and a propelling device therefor, means for lifting said pointer from engagement with its propelling device, a catch for holding said pointer in its elevated position, and a spring for returning said pointer to its normal position when released from said catch.

3. In a switching mechanism, a pointer and a propelling mechanism therefor, means for disengaging said pointer from its propelling mechanism, a device for holding said pointer in its disengaged position, a spring for returning it to its normal position when so disengaged, and means operated by the propelling mechanism for reëngaging said pointer with said propelling mechanism.

Signed by me at Chicago, Illinois, this 9th day of January, 1900.

FRANK A. LUNDQUIST.

Witnesses:
LOUISE PETERSEN,
C. L. REDFIELD.